United States Patent Office 2,828,348
Patented Mar. 25, 1958

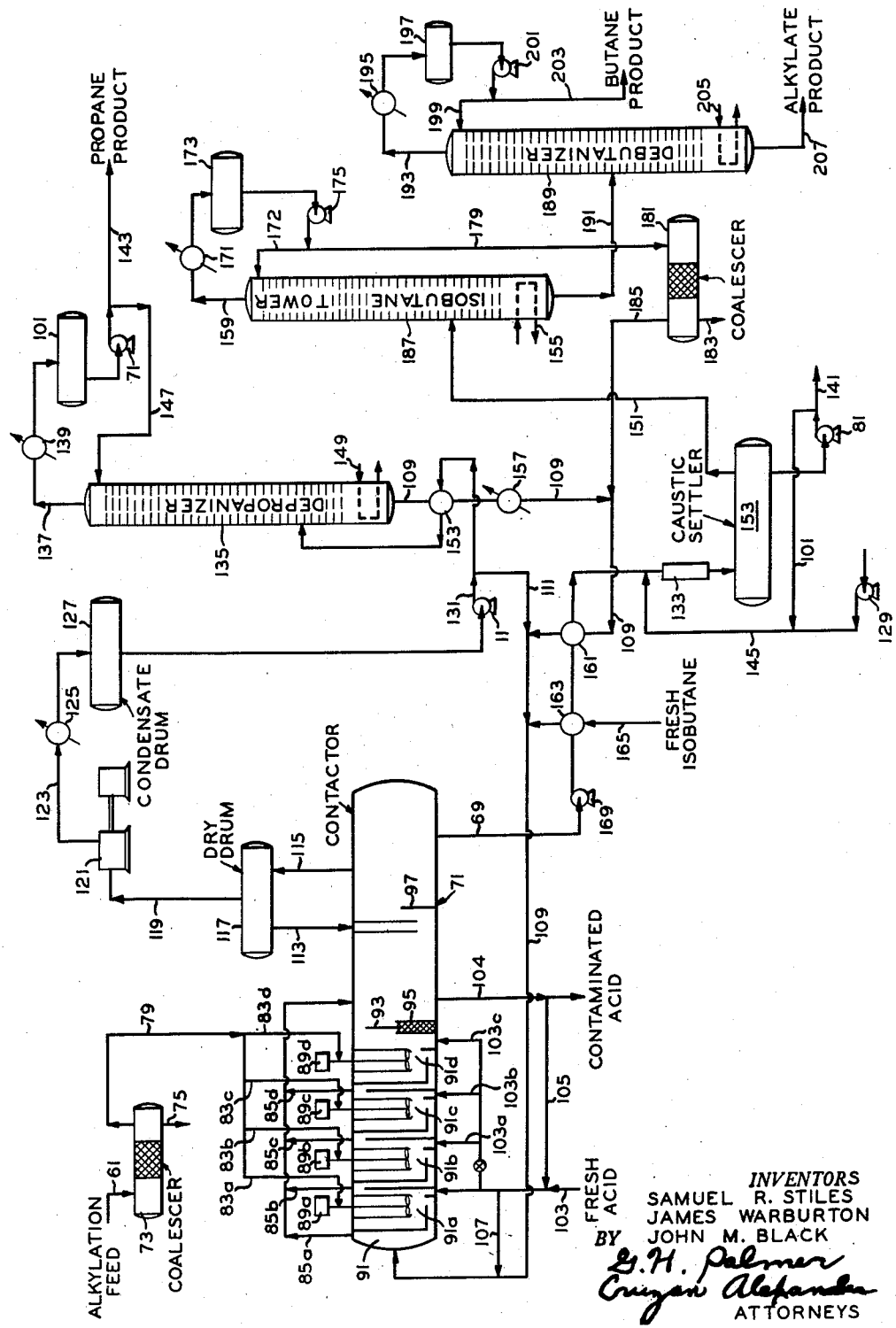

2,828,348

ALKYLATION OF HYDROCARBONS

Samuel R. Stiles, Cresskill, N. J., James Warburton, Diablo, Calif., and John M. Black, Plandome, N. Y., assignors to The M. W. Kellogg Company, Jersey City, N. J., a corporation of Delaware Application October 28, 1955, Serial No. 543,416

5 Claims. (Cl. 260—683.61)

This invention relates to an alkylation process and more particularly to the alkylation of isoparaffins with olefins in the presence of an acid catalyst to produce hydrocarbon compounds boiling in the gasoline range. Still more particularly it relates to a method of decreasing corrosion in an alkylation process of the aforesaid type.

This application is a continuation-in-part of copending application Serial No. 387,118, filed October 20, 1953.

The mechanism of the alkylation reaction, for example the alkylation of isobutane with butylene in the presence of sulfuric acid may be illustrated according to one school of thought by the following reactions:

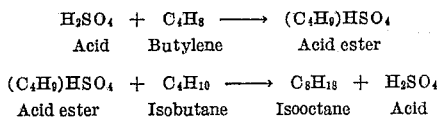

As illustrated, sulfuric acid catalyst reacts with butylene to form butyl acid sulfate which in turn reacts with isobutane to form isooctane, with the sulfuric acid molecule being released for further catalytic action. Although the majority of contacts between the acid, isoparaffin and olefin are followed by the completed condensation reaction, in some cases the acid ester molecule does not come in contact with an isoparaffin molecule and acid esters leave the reaction zone in the product mixture.

In addition to the above reactions, olefins may react with the acid ester to form polymers and free acid as illustrated by the following reaction:

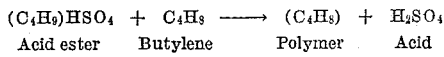

The failure of acid esters to react to form alkylate and the formation instead of olefin polymers results primarily from the fact that the acid ester molecules do not contact isoparaffin molecules. Partial control of the production of polymers and esters, both those illustrated and others of more complex molecular structure and higher molecular weight is provided by contacting the alkylation reaction in such a manner that a large excess of isoparaffin is always present in the reaction zone. In addition, reaction conditions of temperature, pressure, acid concentration, etc., are closely controlled to promote the alkylation reaction. In spite of all precautions, however, acid esters and polymers are produced in the alkylation reaction and these materials are present in the streams leaving the alkylation contactor.

It has been found that most of the acid esters are unstable to heat. As a result, when the process streams leaving the alkylation contactor are subjected to further treatment wherein heat is employed; for example, distillation, decomposition, of at least a portion of the esters quickly follows. Break-down of the esters is accompanied by the evolution of sulfur dioxide, which although non-corrosive by itself, is very corrosive when combined with water to form sulfurous acid. Because of ester decomposition, sulfur dioxide is present in all of the distillation towers in the alkylation unit and is particularly troublesome in the system where lower boiling hydrocarbons are separated.

It is an object of this invention to provide an improved process for the alkylation of hydrocarbons in the presence of an acid catalyst.

It is another object of this invention to decrease acid corrosion in the alkylation of isoparaffins with olefins in the presence of sulfuric acid.

It is still another object of this invention to decrease acid corrosion in the propane fractionation system and reaction zone autorefrigeration system in a process for the alkylation of isoparaffins with olefins in the presence of sulfuric acid.

In carrying out the method of this invention, wet hydrocarbons are dried prior to entering the alkylation contactor by combining them with acid catalyst thereby preventing vaporization of water in the alkylation contactor and passage of water into the hydrocarbon fractionation system.

In a more specific aspect of the invention wet recycle isobutane is dried by combination with sulfuric acid to prevent water from vaporizing in the contactor and passing into the propane fractionation system.

In the commercial alkylation of low boiling isoparaffins with olefins, it is customary to utilize feed stocks varying widely in composition and containing a large variety of saturated and unsaturated compounds. For example, either cracked or straight run refinery gases which are a prime source of alkylation feed stocks may contain paraffins having from 1 to 6 carbon atoms, isoparaffins including isobutane, isopentane and others of higher molecular weight and numerous low boiling olefins and their isomers. It is within the scope of this invention to use feed stocks containing these low boiling compounds in widely varying proportions.

In discussing the application of this invention, it is desirable to consider a specific alkylation reaction. For this reason and because of its widespread use, the subsequent discussion is directed to the reaction of isobutane with butylene in the presence of sulfuric acid. This, however, is not to be construed in any way as limiting the scope of the invention.

The sulfuric acid alkylation of isobutane with butylene is preferably conducted in several stages and at a temperature between about 0° F. and about 100° F. The pressure in the reaction zone is maintained at a level sufficient to keep the reactants in a liquid state, usually between about atmospheric and about 100 p. s. i. g. In order to obtain a high quality alkylate, it is desirable to maintain a high isobutane to olefin ratio in the feed to the reaction zone, preferably between about 2 and about 20 mols per mol and it is necessary to keep the acid catalyst strength above 85 percent and preferably above 90 percent. Sufficient acid concentration to promote the alkylation reaction is provided by maintaining an acid-to-olefin ratio in the contactor of between about 1 and about 20 volume acid per volume olefin per hour.

In a typical application of this invention, isobutane, sulfuric acid and butylene are contacted in a reaction zone to form an alkylate boiling in the gasoline range. The reaction is preferably carried out in several stages or sections with the isobutane and acid catalyst passing serially through the reaction sections and a portion of the butylene being admitted to each section.

Upon introduction into the alkylation contactor the isobutane and sulfuric acid are violently agitated to form an emulsion, this being the preferred method of insuring intimate contact between the acid catalyst and the hydrocarbon to be alkylated. The mixing and agitation required may be provided in a number of ways, however, usually a conventional mixer or pump provides means for creating and moving the emulsion at high velocity and also for circulating the emulsion in the contactor. Inasmuch as the alkylation reaction is usually carried out in several stages or sections, it is desirable to provide a mixer for each reaction stage or section.

The temperature in the reaction zone is maintained at a low level by vaporizing therefrom the lighter components in the reactants and reaction products, more usually, a mixture of butane, isobutane, propane, and any lower boiling compounds. In addition to the foregoing components, the autorefrigeration vapor also contains lower boiling acid esters. A substantial portion of the vaporization occurs after the reactants and reaction products leave the last reaction stage of the contactor, however, in order to provide a more or less constant temperature throughout the contactor and remove both sensible heat from the entering reactants and heat given off in the alkylation reactions, it is necessary that a large amount of liquid be vaporized in each of the reaction sections. To eliminate the possibility of the vapor from each section entering the suction of the mixer in the following section, separate vent lines are provided for removing vapor from each reaction stage.

The major portion of the isobutane feed to the contactor is provided by a stream separated from the effluent from the alkylation contactor. Prior to this separation, the contactor effluent is treated with caustic to neutralize any acid and acidic material carried over from the reaction zone. As a result, this stream is saturated with water when it enters the distillation zone for separation of isobutane and alkylate. Inasmuch as both the isobutane and water pass overhead from this zone, the isobutane separated therein is still saturated with water.

As the first step in removing this water wet isobutane before being returned to the contactor as recycle is passed through a coalescer in which the major portion of undissolved water is removed from this stream. It is then combined with sulfuric acid catalyst which completes the removal of undissolved water and, in addition, removes water dissolved in the hydrocarbon. The mixture of acid and dry hydrocarbon is then admitted to the contactor.

Since this stream enters the contactor at a higher pressure and temperature than exists therein, flash vaporization immediately occurs. As mentioned before, it is most desirable to prevent vapor from entering the suction of the mixing pumps. The possibility of this occuring because of vaporization of recycle isobutane is eliminated by admitting the isobutane-acid mixture to an entrance section prior to the first reaction section and separated therefrom by a baffle closed at the top and open at the bottom. Other than the acid previously combined with the recycle isobutane, no acid is admitted to the entrance section. Vapors are vented from this zone and are combined with vapors leaving the alkylation contactor from the various reaction sections.

The total vapors from the contactor are compressed and condensed and a portion of the condensate is passed to a depropanizing zone wherein propane in an amount equal to the propane in the alkylation feed is removed overhead and yielded from the system as product. The depropanized bottoms plus the remainder of the compressor condensate are combined with the isobutane recycle and are returned to the contactor.

Sufficient heat is generated in the compressor to heat the compressor effluent to a temperature high enough to cause decomposition of a substantial portion of acid esters in this stream. Esters which are not decomposed here are subjected to a second high temperature treatment in the bottom of the depropanizer, where additional decomposition occurs. Sulfur dioxide, evolved as a result of the ester breakdown, passes upward through the depropanizer and out through the overhead system either being vented from the reflux accumulator or passing from the system in the propane product. Prior to this invention, a large part of the water present in the isobutane recycle entering the entrance section of the contactor was vaporized and inasmuch as there was no acid present to absorb the water it became a part of the autorefrigerant vapor passing through the compressor and the depropanizer system. Wherever this water was present in the liquid state and contacted sulfur dioxide, for example, in the compressor condensate drum, the upper portion of the depropanizer, the depropanizer reflux accumulator and associated conduits and pumps, acid corrosion resulted. As a result of this invention, water in the isobutane recycle is absorbed in the acid catalyst; the isobutane recycle enters the alkylation contactor in the dry state and no water passes from the contactor in the autorefrigerant vapor.

The effluent from the last contactor reaction section is passed to a separation zone wherein contaminated acid containing polymers and acid esters is separated from the hydrocarbons. A portion of the contaminated acid is recycled to the contactor and the remainder is either processed to remove contaminants and reused or is used in a treating process wherein a high degree of acid purity is not required or is discarded. Generally, the recycled contaminated acid is combined with fresh acid before being admitted to the contactor. All of the acid admitted to the contactor may be used to dehydrate the isobutane recycle or a portion of it may be admitted to the first or later reaction stages. The alkylate and isobutane which remain after separation of the acid are removed from the contactor for further processing, including the separation of isobutane recycle as hereinbefore described.

In order to more clearly illustrate the invention and to provide a better understanding thereof, reference is had to the attached drawing which is a diagrammatic illustration of a process equipment arrangement used in a preferred embodiment of this invention. Referring to the drawing, the alkylation reactions are carried out in a cylindrical elongated contacting vessel 71. The interior of approximately ⅔ of the contactor is divided into a number of separate reaction stages or sections 91a, 91b, 91c and 91d by transverse baffles so arranged that liquid entering the end of the contactor passes from an inlet chamber 91 upward through the first section 91a over a baffle down to the bottom of the second section 91b, then upward through the second section over a second baffle and in a similar manner through the third and fourth sections 91c and 91d. Each section contains a mixer 89a, 89b, 89c and 89d respectively, in this specific illustration, propeller-type submersible pumps disposed vertically with the drivers located outside and above the contactor and the impellers located in the lower portion of each reaction section. Each pump is so constructed that material entering the suction is forced upward within the casing into the corresponding section. The capacity of each pump is such that the quantity of materials circulated through the pump is several times greater than the total liquid flow entering the section in which the pump is located. By this method of operation it is possible for example to provide an isobutane to butylene ratio of more than 500 to 1 in the mixers with a feed ratio to each reaction section of only 20 to 1.

The alkylation reactants and catalyst enter the contactor 71 at two different points. The alkylation feed comprising a mixture of propane, butane, isobutane and butylene is split into four streams which enter the mixing pumps 89a, 89b, 89c and 89d through conduits 83a, 83b, 83c and 83d respectively. This material passes downward within each pump through a hollow sleeve surrounding the pump shaft and is admitted to the liquid stream flowing through the pump downstream of the pump impeller. A mixture of butane and isobutane made up of compressor condensate material, wet isobutane separated from the contactor effluent in the iso-butane tower and fresh isobutane is admitted to the inlet chamber 91 of the contactor through conduit 109. Before this, however, acid catalyst comprising fresh acid or a mixture of fresh acid and contaminated acid in an amount sufficient to provide an acid-olefin ratio of about 8 volume per volume is combined with the isobutane recycle through conduit 107 in order to absorb the water in this stream. As illustrated, if desired, a portion of the acid may alternately be introduced into all or any of the reaction sections through conduits 103, 103a, 103b and 103c. Hydrocarbon passing from the inlet chamber 91 into the first reaction section 91a is combined with the acid and the mixture enters the suction of the pump 89a where it is picked up, emulsified and directed upward within the pump casing at a high velocity. The alkylation feed from conduit 83a is admitted to the emulsion downstream of the pump impeller and the alkylation reaction proceeds immediately and is substantially completed before the reactants leave the pump casing. As mentioned previously, the capacity of pump 89a is sufficiently great to assure a circulation rate several times as large as the flow of alkylation feed, isobutane and acid into section 91a, thus unreacted isobutane is circulated along with the acid catalyst and a portion of the alkylation product through the pump a number of times before it passes into the next section where another portion is reacted with fresh alkylation feed. The same procedure is repeated in sections 91c and 91d.

The mixture of isobutane, alkylate and acid leaving the last section passes through an emulsion breaking zone 95 formed by parallel transverse baffles and containing a conventional inert packing material. All of the effluent from the last section is forced to flow through this zone by a deflector baffle 93 extending above the liquid level within the contactor and downward within the emulsion breaking zone. Subsequent to this zone, the acid separates from the hydrocarbon oil and is contained in a settling zone enclosed by baffle 97 over which alkylate and unreacted isobutane flow into the remainder of the contactor. The contaminated acid containing polymers and other impurities passes from the contactor 71 through conduit 104. A portion of this acid is combined with fresh acid through conduit 105 and the mixture is added to the wet recycle isobutane through conduit 107 as previously described. The remainder of the acid is passed from the unit for further disposition (not shown).

The alkylation contactor 71 is maintained at a temperature of about 35° F. and at a pressure of about 3.5 p. s. i. g. The alkylation reaction is highly exothermic and is is necessary to provide a method of cooling the contactor to remove the heat of reaction and the sensible heat in the feed streams and thereby maintain the reaction sections at this low temperature. In this specific illustration, the cooling is accomplished by autorefrigeration of the reactants and reaction products. In carrying out this process, vapors comprising a mixture of isobutane, butane and propane are withdrawn from the contactor through conduit 115 into a dry drum 117. Any materials settling in the dry drum are returned to the contactor settling zone beneath the acid level through conduit 113. The dry gas enters the suction of compressor 121 through conduit 119, is compressed, discharged through conduit 123, condensed in a conventional water cooler 125 and passed to a condensate drum 127. It is withdrawn from the condensate drum and divided into two parts, with a portion being sent to the depropanizer 135 and the remainder being returned to the contactor 71 with fresh isobutane and isobutane recycle. It is desirable to proportion the condensed compressor effluent stream so as to maintain a controlled concentration of light materials in the contactor. By this means, it is possible to obtain the desired contactor temperature with a reasonable compressor suction pressure.

A substantial amount of the vaporization which occurs in the contactor 71 takes place in the entrance chamber 91 and the reaction sections 91a, 91b, 91c and 91d. The isobutane recycle stream enters the contactor as liquid and at a higher temperature and pressure than that maintained within the contactor, i. e., about 50° F. and about 20 p. s. i. g. As a result, a portion of this stream flashes in the entrance chamber 91. To prevent a mixture of vapor and liquid from passing into the suction of pump 89a, an outlet for this gaseous material is provided through conduit 85a. A similar situation prevails in each of the reaction sections. In order to remove the reaction heat from each section, it is necessary that a further amount of light material be vaporized therein. This material is supplied primarily in the alkylation feed from conduits 83a, b, c, and d, which feed is also introduced at a temperature and pressure, about 50° F. and about 25 p. s. i. g., substantially higher than exists in the contactor. The vapor so formed is removed from the reaction sections through conduits 85a, b, c and d, is combined with the vapor from conduit 85a, passes into the upper portion of the contactor downstream of the last reaction section and is withdrawn from the contactor through conduit 115. By this method of operation, it is possible to maintain a relatively constant temperature throughout the contactor 71.

The condensed compressor effluent from condensate drum 127 passes through pump 11 and is discharged through conduit 131 with a portion being separated through conduit 111 and joining the wet isobutane recycle through conduit 109 as previously described and the remainder passing through a heat exchanger 153 countercurrent to the depropanizer bottoms and then into the depropanizer 135. Propane is taken overhead from the depropanizer through conduit 137, condensed in a conventional condenser 139 and discharged into accumulator 101. Accumulator liquid is then discharged through a conduit containing pump 71 with a portion being sent to the depropanizer as reflux by conduit 147 and the remainder leaving the unit through conduit 143 as propane product. Heat is supplied to the depropanizer by a conventional reboiler 149 or other conventional heat source. The bottoms comprising primarily isobutane with some butane pass from the bottom of the depropanizer through conduit 109, give up a portion of their heat in exchanger 153 to the depropanizer feed and pass through a conventional water cooler 157 where the temperature is lowered still further. The cool isobutane is combined with wet isobutane from conduit 185 and the mixture is exchanged still again in exchanger 161 with cold effluent from the contactor 71. The combined stream is then further combined with fresh isobutane from conduit 165, which is also exchanged with contactor effluent in exchanger 163, and the total isobutane stream is mixed with acid and admitted to the reactor as previously described.

The alkylation products and unreacted alkylation feed after separation from the spent acid in the contactor 71 pass through conduit 69, pump 169 and exchangers 163 and 161 previously mentioned. The warmer hydrocarbon mixture is combined with caustic discharged from pump 129 through conduit 145 and the combined stream passes through a mixer 133 into a caustic settler 153. Neutralized caustic is removed from the settler by pump 81, a portion being recycled to the mixer 133 through conduit 101 and the remainder being discharged from the unit through conduit 141. The wet acid-free contactor effluent is passed through conduit 151 into the isobutane tower 187 from which isobutane and water are removed overhead through conduit 159, condensed in condenser 171 and collected in accumulator 173. Any free water which accumulates in this vessel is withdrawn and discarded. A portion of the condensed material is returned through pump 175 and conduit 172 to the isobutane tower as reflux. The remainder is discharged through conduit 179, passes through a water coalescer 181 wherein the major portion of the free water is removed, is combined through conduit 185 with the depropanizer bottoms and returned to the contactor as recycle after treatment as previously described. Water separated from this stream is removed from the coalescer through conduit 183. The heat required to vaporize the isobutane in tower 187 is supplied by conventional reboiler 155. The bottoms from the isobutane tower, comprising a mixture of butane and alkylate, pass through conduit 191 to a debutanizer 189 also heated by a conventional reboiler 205. Butane vapor is removed overhead through conduit 193, is condensed in condenser 195 and passes into accumulator 197. Debutanizer recycle is provided from accumulator liquid discharged from pump 201 through conduit 199. The remainder of the condensed overhead is discharged through conduit 203 as butane product. The debutanizer bottoms comprising alkylate leave the debutanizer through conduit 207 for further processing and treatment (not shown).

Although the specific application illustrated is a preferred embodiment of the invention, various modifications thereof are within the scope of the invention. For example, acid catalyst can be combined with wet isobutane as it leaves the isobutane tower, thereby eliminating the coalescer 181. Also, either spent or fresh acid may be used for the drying step with substantially equal success. In addition, equipment modifications can be made, as for example, relocating heat exchange equipment to provide for cooling of the isobutane recycle stream before it passes through water coalescer 181. It is contemplated within the scope of the invention to dry any wet hydrocarbon stream entering the contactor, where such a stream is subject to vaporization before contacting acid catalyst present in the contactor. Thus, the invention is not limited to the drying of isobutane nor is it limited to the drying of a stream admitted to the entrance section 91 of the contactor.

Having thus described the invention by reference to a specific example thereof, it is understood that no undue limitations or restrictions are to be imposed by reason thereof, but that the scope of the invention is defined by the appended claims.

We claim:

1. In a process for the alkylation of hydrocarbons comprising isoparaffins with olefins in the presence of a sulfuric acid catalyst in which the hydrocarbons and acid catalyst are contacted in a reaction zone under conditions including low temperature and pressure suitable to effect said alkylation reaction and wherein the reaction temperature is maintained by vaporizing a portion of the hydrocarbons in said reaction zone and wherein a wet isoparaffin stream is recycled to the reaction zone, the improvement which comprises combining said acid catalyst with said wet isoparaffin stream prior to adding olefin reactant thereto, flashing said combined stream to form a vaporous portion and a liquid portion of said combined stream and thereafter passing said liquid portion in contact with said olefin reactants.

2. The process of claim 1 in which the isoparaffin stream is rich in isobutane.

3. In a process for the alkylation of hydrocarbons comprising isoparaffins with olefins in the presence of a sulfuric acid catalyst in which the reactants and acid catalyst are contacted in a reaction zone under conditions including low temperature suitable to effect the alkylation reaction, the reaction temperature being maintained by vaporizing a portion of the hydrocarbons in the reaction zone and wherein a wet isoparaffin stream is recycled to the reaction zone, the improvement which comprises admixing acid catalyst with said wet isoparaffin recycle stream without the addition of olefin reactant, partially vaporizing said mixture at reduced pressure to cool said mixture, separating dry isoparaffin vapor from said mixture, recovering said dry isoparaffin, and passing the unvaporized portion in contact with said olefin reactants in said reaction zone.

4. A process which comprises contacting hydrocarbons including isoparaffins and olefins in a reaction zone in the presence of a sulfuric acid catalyst under conditions of low temperature and pressure whereby alkylation of the isoparaffins with the olefins is effected to produce a liquid hydrocarbon effluent product, said temperature in said alkylation zone being maintained by vaporizing a portion of the hydrocarbons therein, compressing and condensing said vaporized hydrocarbons and passing the condensate to a first distillation zone wherein low boiling paraffin hydrocarbons are separated from a bottom isoparaffin fraction, treating the liquid hydrocarbon effluent from the alkylation zone with an aqueous basic material to neutralize entrained acid, passing the neutralized hydrocarbon effluent to a second distillation zone wherein wet isoparaffins are separated from the hydrocarbon effluent, combining the wet isoparaffins with the bottom isoparaffin fraction from the first distillation zone, adding acid catalyst to the combined isoparaffins and passing the same to a zone of reduced pressure whereby the mixture is cooled by partial vaporization, separating the vaporized portion from said zone of reduced pressure and thereafter passing said unvaporized portion in contact with said olefin reactants.

5. A process which comprises contacting hydrocarbons including isobutane and butylene in an alkylation zone in the presence of a sulfuric acid catalyst under conditions of low temperature and pressure whereby alkylation of the isobutane with butylene is effected, said temperature in the alkylation zone being maintained by vaporizing a portion of the hydrocarbons therein, separating the vaporized hydrocarbons from the alkylation zone, compressing and condensing the separated vaporized hydrocarbons, passing the condensate to a first distillation zone, separating low boiling paraffin hydrocarbons from a bottoms fraction containing isobutane in said first distillation zone, separating liquid effluent from the alkylation zone and contacting the same with an aqueous basic material to neutralize entrained acid, passing the neutralized effluent to a second distillation zone wherein a wet isobutane stream is separated from the neutralized effluent, combining the wet isobutane stream from the second distillation zone with the isobutane bottom stream from the first distillation zone, adding acid catalyst to the combined isobutane stream whereby the wet isobutane stream is dried and passing the isobutane and acid stream without added butylene reactant into a zone maintained at a reduced pressure whereby a portion of the isobutane is vaporized, separating dry isobutane vapors from said zone and passing the remaining portion of said isobutane stream at a reduced temperature and pressure in contact with said butylene reactant in said alkylation zone.

References Cited in the file of this patent
UNITED STATES PATENTS

| 2,320,199 | Sellmeyer | May 25, 1943 |
| 2,366,627 | Kemp | Jan. 2, 1945 |
| 2,441,249 | Ocon et al. | May 11, 1948 |